United States Patent Office 3,346,662
Patented Oct. 10, 1967

3,346,662
PREPARATION OF LINEAR INTERNAL OLEFINS
Donald H. Antonsen, Glen Mills, Pa., assignor to Sun Oil Company, Philadelphia, Pa., a corporation of New Jersey
No Drawing. Filed Mar. 18, 1964, Ser. No. 352,950
19 Claims. (Cl. 260—683.15)

ABSTRACT OF THE DISCLOSURE

Unbranched internal olefins of trans structure which are dimers of $C_6$–$C_{24}$ linear alpha olefins are prepared in high concentration. The method involves polymerizing the feed olefin, with or without an added solvent, at 0–50° C. by means of a catalyst comprising $TiCl_4$ combined with $AlR_3$, $AlR_2Cl$, $AlR_{1.5}Cl_{1.5}$ or $AlCl_2$ in ratios such that R:Ti is in the range 0.5–5.0. The catalyst preferably is modified by incorporating therein certain proportions of an oxirane, a methyl alkyl ether, a ditertiary alkyl peroxide, a tetraalkyl silicate, or a tertiary or aromatic amine oxide to increase the dimer yield. The dimer fraction, which is separated from the reaction product, is composed mainly of the trans linear internal olefin along with minor amounts of other olefin types, particularly vinylidene. The dimer fraction is then treated to separate the unbranched trans olefin in high concentration, for example, by treatment with concentrated nitric acid.

Cross references to related applications

This application is a continuation-in-part of copending applications Ser. No. 241,517, filed Dec. 3, 1962, now Patent No. 3,179,711, issued Apr. 20, 1965; Ser. No. 333,629, filed Dec. 26, 1963, now abandoned; and Ser. No. 337,136, filed Jan. 13, 1964, now Patent No. 3,259,-668, issued July 5, 1966; said application Ser. No. 333,629 being a continuation-in-part of copending application Ser. No. 251,724, filed Jan. 16, 1963, and now abandoned, which last-named application was a continuation-in-part of copending application Ser. No. 146,436, filed Oct. 20, 1961, and now abandoned.

This invention relates to linear internal olefins having trans structure and more particularly concerns the preparation of linear trans olefins of the $C_{12}$–$C_{48}$ range by the catalytic dimerization of linear alpha olefins by the $C_6$–$C_{24}$ range. By way of example, the invention provides a method for dimerizing n-octene-1 to obtain unbranched trans olefin having sixteen carbon atoms per molecule.

Non-cyclic olefins or alkenes having twelve or more carbon atoms per molecule have been produced in various ways heretofore. Terminal non-branched olefins have been produced by the cracking of paraffin waxes and also by polymerizing ethylene by the Ziegler route. Internal olefins which are $C_{12}$ and higher have been produced by catalytically polymerizing lower olefins, such as by polymerizing propylene using a phosphoric acid catalyst. The olefins formed in this manner are mainly internal olefins which are highly branched and which include both the cis and trans forms. No process appears to have been available heretofore for producing $C_{12}$ and higher internal olefins having trans configuration and no branching and without the concurrent formation of cis olefins.

The present invention provides a process for making linear trans olefins having twelve or more carbon atoms per molecule without the formation of cis olefins. This trans olefin product can be obtained by polymerizing a linear alpha olefin of the $C_6$–$C_{24}$ range under conditions as hereinafter specified, distilling the reaction product to obtain a dimer fraction and thereafter selectively separating and recovering the linear trans olefin which is the predominant component of the dimer fraction. The conditions of polymerization are such that substantially no dimer of cis configuration is formed, and hence the separation of the trans product from other oligomers associated with it can be more easily effected than otherwise would be the case.

The polymerization reaction for producing linear trans olefin as the major product in the dimer fraction briefly is carried out in the following manner: A linear alpha olefin of the $C_6$–$C_{24}$ range, preferably a $C_6$–$C_{15}$ olefin, at a temperature in the range of 0–50° C., and either with or without a solvent as hereinafter specified, is contacted with a catalyst system comprising titanium tetrachloride ($TiCl_4$) and an aluminum alkyl compound selected from the following types:

(1) Aluminum trialkyl ($AlR_3$)
(2) Aluminum dialkyl chloride ($AlR_2Cl$)
(3) Aluminum alkyl sesquichloride ($AlR_{1.5}Cl_{1.5}$)
(4) Aluminum alkyl dichloride ($AlRCl_2$)

The proportions of $TiCl_4$ and aluminum alkyl compound are such that the R:Ti molar ratio is in the range of 0.5–5.0. For each type of aluminum alkyl compound above shown there is a preferred range for the R:Ti molar ratio, as hereinafter fully specified. Contact of the catalyst system, obtained from the combination of $TiCl_4$ with any of the types of aluminum alkyl compounds specified above, with the alpha olefin charge causes the olefin to polymerize yielding a series of oligomers ranging from dimers to viscous oils. In the dimer fraction the linear trans olefin constitutes the major component and it is not associated with any cis isomer. Selective separation of the trans material from associated material can be effected as hereinafter more fully described.

The catalyst system, which basically comprises $TiCl_4$ and an aluminum alkyl compound of the types specified above, can be modified by the addition of certain types of oxygen-containing compounds to improve the yield of the dimeric trans olefin product. The types of oxygen-containing compounds that can be used are as follows:

(1) Oxiranes or methyl alkyl ethers,
(2) Ditertiary alkyl peroxides,
(3) Tetraalkyl silicates, and
(4) Tertiary amine oxides or aromatic amine oxides.

The use of these oxygen-containing compounds for modifying the catalyst system is more fully described hereinafter. In general the effect of incorporating an appropriate amount of one of these oxygen-containing compounds in the catalyst is to increase the concentration of the trans olefin product in the dimer fraction and, in most cases, to increase the yield of the dimer fraction.

The preferred types of aluminum alkyl compound for practicing the invention is the sesquichloride ($AlR_{1.5}Cl_{1.5}$). Use of the sesquichlorides generally results in a higher yield of the desired linear trans olefin dimer material than is obtained when the other aluminum alkyl compounds are employed. However, good results can be obtained employing any of the types of aluminum compounds specified above if the R:Ti molar ratio is in the range of 0.5–5.0. For best results with each type of aluminum alkyl compound the molar ratios of R:Ti should be as follows:

|  | R:Ti ratio |
|---|---|
| AlR | 0.6–3.0 |
| $AlR_2Cl$ | 1.6–5.0 |
| $AlR_{1.5}Cl_{1.5}$ | 1.2–3.8 |
| $AlRCl_2$ | 0.9–3.0 |

The R:Ti ratio of course is established by the proportion of the aluminum compound to the $TiCl_4$ employed. Generally the proportions used are such that the atomic ratio of Al to Ti is in the range of 0.8–2.5.

The number of carbon atoms in the alkyl (R) group of the aluminum compound is not particularly important. This group can, for example, vary in number of carbon atoms from one to ten. Preferably R is a straight chain alkyl group such as methyl, ethyl, n-propyl, n-butyl, n-hexyl, n-octyl, n-decyl or the like, although it can also be a branched chain alkyl group such as isobutyl or isopentyl.

The polymerization reaction can be carried out either with or without a solvent being employed. When no solvent is used, the olefin charge itself functions as the reaction medium and the catalyst is prepared in situ by adding the three above-specified catalyst components to the olefin monomer. In the absence of a solvent there is a tendency for the catalyst to degradate more rapidly and its rate of deterioration depends upon its concentration; hence the olefin to $TiCl_4$ weight ratio preferably should be in excess of 100:1. Alternatively the reaction can be carried out in the presence of a solvent which can be saturated hydrocarbon or certain types of halohydrocarbons, in which case olefin to $TiCl_4$ ratios below 100:1 can be used if desired without undue degradation of the catalyst occurring. When a saturated hydrocarbon solvent is used, it can be a paraffinic hydrocarbon, including both n-paraffins and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimethylcyclohexane and the like.

It is distinctly advantageous in practicing the invention to employ a halohydrocarbon as solvent or reaction medium. This type of solvent tends to increase the proportion of dimer in the reaction product and in some cases increases the trans olefin content of the dimer fraction. The types of halohydrocarbons that are most suitable for this purpose are halobenzenes having 1–2 halogen atoms, trihaloethanes, tetrahaloethanes, trihaloethylenes and tetrahaloethylenes, in which halohydrocarbons the halogen can be either chlorine or fluorine or both. Particularly suitable solvents are the monohalobenzenes, viz., chlorobenzene and fluorobenzene, and dihalobenzenes which are liquid at the reaction temperature such as ortho- and meta-dichlorobenzenes or difluorobenzenes. Examples of other halohydrocarbons that can be used are: methyl chloroform; 1,1,2-trichloroethane; 1,1,2,2-tetrachloroethane; trifluoroethanes; chlorodifluoroethanes; tetrafluoroethane; and similar ethylene derivatives containing 3–4 halogen atoms which are chlorine and/or fluorine. In using a solvent the weight ratio thereof to olefin monomer generally is in the range of 1:2 to 4:1.

The weight proportion of olefin charge to titanium tetrachloride used in the reaction mixture can vary widely, ranging for example from 25:1 to 1000:1 depending upon the purity of the olefin charge, the absence or presence of a solvent, the type of solvent used and the type of aluminum alkyl compound employed.

The temperature for carrying out the reaction is in the range of 0–50° C. With either no solvent or a saturated hydrocarbon solvent a temperature of 10–30° C. preferably is used, while with a halohydrocarbon solvent the preferred temperature is 25–40° C. At temperatures below 0° C. substantially no reaction is obtained, while at temperatures above 50° C. the catalyst rapidly becomes deactivated.

At the proper reaction conditions generally 65–85% of the olefin charged can be converted to oligomers and 10–30% of the total oligomers is dimer product. The amount of linear trans olefin in the dimer product generally can vary between 50% and 85% depending largely upon which type of aluminum alkyl is used, whether or not a chlorohydrocarbon solvent is employed and also whether the catalyst system has been modified by incorporating a suitable amount of one of the oxygen-containing modifiers therein.

The preferred class of oxygen-containing compounds for modifying the catalyst system comprises ethers which can be either oxiranes or methyl alkyl ethers. Oxiranes for this purpose conform to the formula:

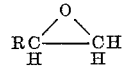

wherein R is either hydrogen or an alkyl group of 1–20 carbon atoms. Examples of oxiranes for use in modifying the catalyst are ethylene oxide, propylene oxide and the 1,2-epoxy derivatives of butane, n-pentane, isopentane, n-hexane, isohexanes, octanes, decanes, dodecanes, cetane, octadecanes, etc. When the oxygen-containing component of the catalyst system is a methyl alkyl ether, the alkyl group can be any of those specified above for the oxirane compounds. Examples are dimethyl ether, methyl ethyl ether, methyl propyl ether, methyl isobutyl ether, methyl hexyl ethers, methyl decyl ethers, etc.

In employing such ethers as catalyst modifiers the proportion thereof relative to the aluminum alkyl compound should be such that the atomic ratio of O to Al is in the range of 0.3–0.9, more preferably 0.4–0.8. These ethers preferably are employed with either $AlR_{1.5}Cl_{1.5}$ or $AlR_2Cl$ as the aluminum compound. The effect of incorporating the ether in the system is to increase the linear trans olefin content of the dimer fraction. Ethers of the types specified having eight or more carbon atoms are preferred, as they also increase the proportion of dimer fraction in the reaction product.

A second class of oxygen-containing compounds for modifying the catalyst comprises the ditertiary alkyl peroxides. This component can be any peroxide represented by the formula ROOR' wherein R and R' are the same or different tertiary alkyl radicals having, for example, up to twenty carbon atoms. The lower peroxides such as ditertiary butyl peroxide or ditertiary amyl peroxide are preferred. The proportion of peroxide used relative to the aluminum alkyl compound should be such that the atomic ratio of O to Al again is in the range of 0.3–0.9, more preferably 0.4–0.8. Incorporation of a peroxide in the catalyst has a similar beneficial effect to that obtained with the higher ethers in increasing both the amount of dimer and its linear trans olefin content.

Another class of compounds for modifying the catalyst comprises tetraalkyl silicates in which the alkyl groups each have 1–4 carbon atoms and are unbranched. In other words the alkyl groups can be methyl, ethyl, n-propyl or n-butyl. The four alkyl groups can all be the same or the silicate can contain mixed alkyl groups of the class specified. Thus examples of the silicate component are tetramethyl silicate, tetraethyl silicate, tetra n-butyl silicate, methyl triethyl silicate, diethyl dipropyl silicate and methyl diethyl butyl silicate. Modifiers of this type should be used in amount such that the atomic ratio of O to Al in the catalyst system is within the range of 0.4–0.8, more preferably 0.5–0.7. When used in such amount the tetraethyl silicate also causes increases both in the amount of dimer and in its linear trans olefin content.

The other class of catalyst modifiers is amine oxides which can be any tertiary amine oxide or any aromatic amine oxide. Compounds of this type are known and can be prepared by oxidizing either tertiary or aromatic amines with a suitable oxidizing agent such as hydrogen peroxide. (See, for example, Fieser and Fieser, "Advanced Organic Chemistry," pages 513–514 (1962)). Either the tertiary or aromatic amine oxides should be used in amount such that the O to Al atomic ratio in the catalyst system is in the range of 0.2–0.6.

The term "tertiary amine" as used herein refers to amines in which the nitrogen atom is attached through its three valences to three separate carbon atoms which can be carbon atoms of the same or different hydrocarbon groups that can be alkyl, alkenyl, alkynyl, aryl, alkaryl or aralkyl. The oxides of such amines are represented by the formula

wherein each valence connects the nitrogen with a different carbon atom and the oxygen is joined to the nitrogen by a coordinate covalent link. The three valence bonds can attach the nitrogen atom to from one to three separate hydrocarbon groups which can be of the same or different types, i.e., alkyl, aryl, etc. The following are specific examples of other tertiary amines corresponding to the oxides employed in the present invention: trimethylamine; triethylamine; triisobutylamine; tridecylamine; trilaurylamine; methyldipropylamine; dimethylcyclohexylamine; tricyclopentylamine; triphenylamine; phenyldimethylamine; tribenzylamine; dimethylcyclooctylamine; N-methylpiperidine; N-ethylpyrrolidine; quinuclidine and the like.

In place of the tertiary amine oxides discussed above the catalyst system can be modified by employing the oxides of aromatic amines. The term "aromatic amine" as used herein refers to amines in which the nitrogen atom is a member of an aromatic ring and thus is attached to only two carbon atoms. The amine oxides of this type are represented by the formula:

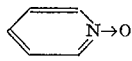

wherein the nitrogen-containing ring may be attached to other hydrocarbon groups which can be either aromatic or nonaromatic or the ring can be part of a fused ring system. Examples of aromatic amines corresponding to the oxides of this class are as follows: pyridine; alpha, beta- or gammapicoline; quinoline; isoquinoline; quinaldine; lepidine; and acridine.

The above-described catalyst systems are capable of polymerizing any straight chain alpha olefin of the $C_6$–$C_{24}$ range and forming in the reaction product a substantial amount of dimer fraction composed mainly of linear trans olefin. In the reaction of octene-1 at room temperature about 50% typically is converted to higher boiling products in 6–8 hours and the maximum conversion of about 80–85% will have been reached in 20 hours. After the reaction the catalyst can be deactivated and its residues removed in any suitable manner. The dimer fraction is then separated and recovered from the reaction product by fractional distillation. The linear trans olefin is thereafter selectively separated from the dimer fraction as hereinafter described. Oligomers that boil above the dimer fraction constitute excellent lubricating oil stock and can be used to prepare various special high quality lubricants.

In the polymerization of olefins by means of coordination catalysts of the general type herein concerned, it has usually been considered that propagation occurs through a heat-to-tail coupling reaction, illustrated as follows:

This type of reaction results in olefin oligomers of the vinylidene type. It is therefore surprising that the dimer product of the present process is mainly unbranched trans olefin. This type of structure apparently comes about through a head-to-head coupling reaction, illustrated as follows:

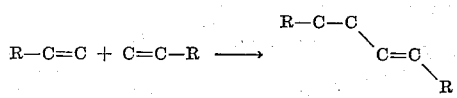

Infrared spectroscopy has shown that this linear trans structure constitutes the main component of the dimer product. Additionally the dimer contains a minor amount (often 10–20%) of the vinylidene type of olefin and it also appears to contain a small percentage (e.g. <5%) of vinyl olefin (R—C=C). No olefin of cis configuration is present. Hydrogenation of the dimer fraction produces the straight chain paraffin corresponding to the trans component, which paraffin will readily crystallize from the hydrogenated mixture. For example, hydrogenation of the dimer from n-octene-1 and n-decene-1 produces, respectively, n-hexadecane and n-eicosane. By vapor phase chromatography all of the trans olefin in the dimer product tends to appear under a single large peak. However upon greater resolution this trans olefin appears to be composed of two components which are believed to be isomers varying only by a single carbon atom difference in the position of the double bond along the chain. For example, the trans olefin appears to be a mixture of 6- and 7-hexadecene in the case of the dimer of octene-1 and 8- and 9-eicosene in the case of decene dimer.

After the dimer fraction has been distilled from the reaction product, it is processed to selectively separate and recover the linear trans olefin in highly pure form. For dimers formed from the lower alpha olefins of the specified range, for example, for $C_{12}$ or $C_{14}$ dimers, such separation can be effected by fractional distillation since the trans olefin is substantially higher boiling than the rest of the dimer material. Also separation by fractional crystallization can be effected as the trans olefin, being unbranched, has the highest melting point.

A particularly suitable means for obtaining the linear trans olefin in purified form is by treatment of the dimer fraction with concentrated nitric acid. For example, the dimer fraction is contacted vigorously at room temperature with 5–10% by volume of concentrated (70%) nitric acid, the sludge which forms is removed, and then the treatment is repeated several times with fresh nitric acid. Finally nitrogen-containing compounds which are dissolved in the hydrocarbon phase are removed therefrom by extraction with furfural. This procedure removes all of the vinylidene type of olefin and gives purified trans olefin contaminated substantially only with whatever small amount of vinyl olefin may have been present in the dimer fraction. Typically, purities for the linear trans olefin of the order of 95–99% can be obtained in this manner.

The following examples illustrate the invention more specifically:

Example I

In a stirred reactor that has been carefully dried a catalyst system is prepared by adding to 190 ml. of dried n-hexane 10.4 ml. of a 3.18 molar hexane solution of aluminum ethyl sesquichloride, 2.91 ml. (5.03 g.) of $TiCl_4$ and 22 ml. of a 1.0 molar hexane solution of propylene oxide. The components of the catalyst system are added to the reactor in the order mentioned. The Al:Ti ratio in the mixture is 1.25, the R:Ti ratio is 1.88 and the O:Al ratio is 0.67. Octene-1 is then introduced therein in amount of 260.9 g. and the mixture is stirred at 20° C. for 20 hours. The catalyst is then deactivated by adding to the reaction mixture 20 g. of $Na_2CO_3$, adding 25 ml. of water with thorough mixing and then filtering. The filtrate is topped to remove unpolymerized octene, and the yield of total oligomers is about 80% by weight based on the monomer charged. The dimer is then separated by vacuum distillation at a pump pressure of about 0.1 mm. Hg absolute and collecting the fraction boiling within the temperature range of 105–125° C. The dimer is about 15% by weight of the total oligomer product. This fraction has the following properties and composition with respect to olefin types:

| | |
|---|---|
| Pour point, ° F. | −45 |
| KV @ 100° F., cs. | 2.88 |
| KV @ 210° F., cs. | 1.18 |
| R.I., $n_D^{20}$ | 1.4438 |
| Olefin types (by infrared): | |
| Vinyl _____percent_ | 2.1 |
| Vinylidene _____do_ | 10.9 |
| Trans _____do_ | 87.0 |

The dimer fraction is treated at room temperature with four successive batches of concentrated (70%) nitric acid each in amount of 10% by volume of the hydrocarbon. Each treatment involves vigorously agitating the hydrocarbon with the acid and then separating the hydrocarbon from the acid and sludge formed. Finally the hydrocarbon is extracted with an equal volume of furfural to remove any nitrogen-containing compounds therefrom and is then water washed and dried. Infrared analysis of the treated product gives the following olefin type composition:

| | Percent |
|---|---|
| Vinyl | 2.3 |
| Vinylidene | None |
| Trans | 97.7 |

*Example II*

When the preceding example is repeated except that the catalyst system is modified by substituting for the propylene oxide an equal molar amount of 1,2-epoxydodecane, about 62% of the octene is converted to oligomers and the proportion thereof constituting the dimer is increased from 15% to about 27%. Purified linear trans olefin can be obtained therefrom in the same manner as described in Example I.

*Example III*

Decene-1 is polymerized in substantially the same manner as described in Example I for octene-1. About the same degree of conversion (80%) of the monomer is obtained. Upon fractionally distilling the reaction product the $C_{20}$ dimer product is obtained as a fraction boiling in the range of 135–155° C. at 0.1 mm. Hg absolute pump pressure. This product constitutes about 18% of the total oligomers. It has the following properties and olefin type composition:

| | |
|---|---|
| Pour point, ° F. | +5 |
| KV @ 100° F., cs. | 3.44 |
| KV @ 210° F., cs. | 1.39 |
| R.I., $n_D^{20}$ | 1.4470 |
| Olefin types: | |
| Vinyl | 2.6 |
| Vinylidene | 9.4 |
| Trans | 88.0 |

Upon treating this material with nitric acid as described above, a product composed of about 97% linear trans olefin is obtained. Hydrogenation of this product yields n-eicosane.

When any of the other catalyst systems herein described are substituted for those used in the preceding examples, substantially analogous results are obtained.

I claim:

1. Method of preparing linear internal olefins of trans structure which comprises contacting a linear alpha olefin of the $C_6$–$C_{24}$ range at a temperature in the range of 0–50° C. with a catalyst system comprising $TiCl_4$ and an aluminum alkyl compound selected from the group consisting of $AlR_3$, $AlR_2Cl$, $AlR_{1.5}Cl_{1.5}$ and $AlRCl_2$ wherein the proportions of $TiCl_4$ and aluminum alkyl compound are such that the R:Ti molar ratio is in the range of 0.5–5.0, whereby conversion of said alpha olefin to higher boiling compounds occurs, distilling the reaction product to obtain a dimer fraction comprising a major amount of unbranched trans olefin dimer and a minor but substantial amount of vinylidene-type dimer, and selectively separating from said dimer fraction the unbranched trans olefin dimer in a product concentration of at least 95%.

2. Method according to claim 1 wherein the aluminum alkyl compound is $AlR_3$ and the R:Ti molar ratio is in the range of 0.6–3.0.

3. Method according to claim 1 wherein the aluminum alkyl compound is $AlR_2Cl$ and the R:Ti molar ratio is in the range of 1.6–5.0.

4. Method according to claim 1 wherein the aluminum alkyl compound is $AlR_{1.5}Cl_{1.5}$ and the R:Ti molar ratio is in the range of 1.2–3.8.

5. Method according to claim 1 wherein the aluminum alkyl compound is $AlRCl_2$ and the R:Ti molar ratio is in the range of 0.9–3.0.

6. Method according to claim 1 wherein the catalyst system also contains an oxygen-containing organic compound selected from the group consisting of oxiranes having the formula

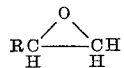

wherein R is selected from the group consisting of hydrogen and alkyl groups having 1–20 carbon atoms and methyl alkyl ethers in which the alkyl group has 1–20 carbon atoms, the amounts of said organic compound relative to said aluminum alkyl compound being such that the atomic ratio of O to Al is in the range of 0.3–0.9.

7. Method according to claim 6 wherein said aluminum alkyl compound is $AlR_2Cl$.

8. Method according to claim 6 wherein said aluminum alkyl compound is $AlR_{1.5}Cl_{1.5}$.

9. Method according to claim 1 wherein the catalyst system also contains a ditertiary alkyl peroxide in amount such that the atomic ratio of O to Al is in the range of 0.3–0.9.

10. Method according to claim 1 wherein the catalyst system also contains a tetraalkyl silicate in which the alkyl groups each have 1–4 carbon atoms and are unbranched, in amount such that the atomic ratio of O to Al is in the range of 0.4–0.8.

11. Method according to claim 1 wherein the catalyst system also contains an amine oxide selected from the group consisting of tertiary amine oxides and aromatic amine oxides and the amount of said amine oxide is such that the atomic ratio of O to Al is in the range of 0.2–0.6.

12. Method according to claim 1 wherein the reaction mixture includes a saturated hydrocarbon reaction medium.

13. Method according to claim 1 wherein the reaction mixture includes a halohydrocarbon reaction medium.

14. Method according to claim 13 wherein said halohydrocarbon is chlorobenzene.

15. Method of preparing linear internal olefins of trans structure which comprises contacting a linear alpha olefin of the $C_6$–$C_{15}$ range at a temperature in the range of 0–50° C. with a catalyst system comprising $TiCl_4$ and an aluminum alkyl sesquichloride in proportions such that the Al:Ti atomic ratio is in the range of 0.8–2.5, whereby conversion of said alpha olefin to higher boiling compounds occurs, distilling the reaction product to obtain a dimer fraction comprising a major amount of unbranched trans olefin dimer and a minor but substantial amount of vinylidene-type dimer, and selectively separating from said dimer fraction the unbranched trans olefin dimer in a product concentration of at least 95%.

16. Method according to claim 15 wherein the catalyst system also contains an oxygen-containing organic compound selected from the group consisting of oxiranes having the formula

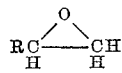

wherein R is selected from the group consisting of hydrogen and alkyl groups having 1–20 carbon atoms and methyl alkyl ethers in which the alkyl groups has 1–20 carbon atoms, the amounts of said organic compound relative to said aluminum alkyl sesquichloride being such that the atomic ratio of O to Al is in the range of 0.3–0.9.

17. Method according to claim 16 where the reaction mixture includes a halohydrocarbon reaction medium.

18. Method according to claim 17 wherein said halohydrocarbon is chlorobenzene.

19. Method according to claim 1 wherein the selective separation of said unbranched trans olefin is effected by treating the dimer fraction with concentrated nitric acid to convert other olefin material therein to sludge and separating the sludge from said unbranched trans olefin.

(References on following page)

References Cited

UNITED STATES PATENTS

| | | | |
|---|---|---|---|
| 3,156,736 | 11/1964 | Southern et al. | 260—683.15 |
| 3,179,711 | 4/1965 | Antonson | 260—683.15 |
| 3,206,523 | 9/1965 | Antonson | 260—683.15 |
| 3,253,052 | 5/1966 | Antonson et al. | 260—683.15 |
| 3,259,668 | 7/1966 | Antonson | 260—683.15 |

OTHER REFERENCES

Urbanski: Chemistry and Technology of Explosive vol. I, p. 84, MacMillan Co., N.Y., 1964. (U.S. translatio of earlier-published Polish text.)

DELBERT E. GANTZ, *Primary Examiner.*

R. SHUBERT, G. J. CRASANAKIS, *Assistant Examiner.*